US006478459B1

(12) United States Patent
Ui

(10) Patent No.: US 6,478,459 B1

(45) Date of Patent: Nov. 12, 2002

(54) HEAD LIGHT SYSTEM

(75) Inventor: Takahiro Ui, Gunma (JP)

(73) Assignee: Asahi Electric Works Ltd., Gunma (JP)

(*) Notice: Subject to any disclaimer, the term of this patent is extended or adjusted under 35 U.S.C. 154(b) by 0 days.

(21) Appl. No.: 09/562,863

(22) Filed: May 1, 2000

(30) Foreign Application Priority Data

May 14, 1999 (JP) .......................................... 11-133804
Dec. 27, 1999 (JP) .......................................... 11-369180

(51) Int. Cl.[7] ................................................ B60Q 1/04

(52) U.S. Cl. ...................... 362/512; 362/539; 362/277; 362/285

(58) Field of Search ................................ 362/508, 509, 362/512, 513, 539, 277, 282, 285, 287, 523

(56) References Cited

U.S. PATENT DOCUMENTS

| | | | | | |
|---|---|---|---|---|---|
| 4,951,178 | A | * | 8/1990 | Shirai et al. | 362/512 |
| 4,987,521 | A | * | 1/1991 | Fratty et al. | 362/512 |
| 5,213,406 | A | * | 5/1993 | Neumann et al. | 362/512 |
| 5,339,226 | A | * | 8/1994 | Ishikawa | 362/512 |
| 5,911,502 | A | * | 6/1999 | Zillgitt et al. | 362/508 |
| 6,170,970 | B1 | * | 1/2001 | Eto | 362/539 |
| 6,176,604 | B1 | * | 1/2001 | Dubrovin et al. | 362/539 |
| 6,190,029 | B1 | * | 2/2001 | Taniuchi et al. | 362/512 |
| 6,206,555 | B1 | * | 3/2001 | Redzinksky | 362/526 |

* cited by examiner

*Primary Examiner*—Sandra O'Shea
*Assistant Examiner*—Peggy A Neils
(74) *Attorney, Agent, or Firm*—Arent Fox Kintner Plotkin Kahn

(57) ABSTRACT

A head light system for a vehicle using a discharge lamp together with glare stop structure provides a low beam mode and a high beam mode. The head light system includes a discharge lamp (4) mounted on a base plate (1), a shade (7) for selectively and partially shading light source (5) of the discharge lamp (4), and a moving means (K) for sliding said shade (7) relative to the discharge lamp (4) along an arrow (X) in a longitudinal direction of the discharge lamp (4). The shade (7) has a leg (7*b*) which penetrates the base plate (1), and the leg (7*b*) is coupled with an iron piece (9) in a solenoid (8) which is fixed to a rod (6) fixed under the base plate (1). The iron piece (9) is urged by a spring (10) so that shade plane (7*a*) of the shade (7) partially covers the light source (5) of the discharge lamp (4) when the solenoid is not energized so that low beam mode is provided. When the solenoid (8) is energized and pulls the iron piece (9) against the spring (10), the shade (7) slides so that said light source (5) is free from the shade plane (7*a*) to provide high beam mode.

7 Claims, 6 Drawing Sheets

HEAD LIGHT SYSTEM

BACKGROUND OF THE INVENTION

The present invention relates to a head lamp system of a vehicle. In particular, the invention relates to a head lamp system which has a discharge lamp, or a xenon arc lamp which is abbreviated as HID. A head lamp system using a discharge lamp is a promising future endeavor.

Conventionally, a head lamp system uses a filament lamp in the form of a projector type head light system or a multi-reflector type head light system. The lamp comprises a halogen lamp (iodine lamp) which is almost a point light source, and a reflector mounted around the lamp. Typically, a conventional filament lamp consumes 35–60 watts, and radiates 20 lumen/watt.

A conventional projector type head light system has two technical standards, PE (polyellipsoid), and DE (three dimensional ellipsoid). A conventional projector type head light system has a technical standard MS (multi surface).

A halogen lamp used in a conventional head light system operates with low power voltage, for instance, 12 V or 24 V. Therefore, no specific insulation means is requested. The average life time of a prior halogen lamp is approximately 400 hours. Some of technical standards for a conventional halogen lamp, are H-1, HB-1, H-4, HB-4, HB-5 and H-7. Each of the standards has a related technical standard for a flange type base plate which is coupled with a lamp, and a base plate acceptor which carries a lamp.

Because of regulations, a head light must be switched to one of high beam mode which illuminates long distance and low beam mode which illuminates short distance. This switching is conventionally carried out in two manners.

The first one has a first lamp for high beam mode and a second lamp for low beam mode. In this example, the two lamps are mounted around a center of a reflector, and one of the lamps is selectively turned ON.

The other one includes, as shown in the technical standard H-4, a single halogen lamp having a first filament for high beam mode, and a second filament for low beam mode. The second filament is partially covered with a shade, so that one of the filaments is selectively turned ON. In high beam mode, only a first filament for high beam mode is turned ON. In low beam mode, only a second filament which is partially covered with a shade is turned ON so that a part of light is prevented by the shade.

A discharge lamp is promising for head lights of the future, and would substitute a conventional halogen lamp.

A discharge lamp operates with high power voltage, approximate 20000 volts, and radiates light beams with high efficiency. For instance, a discharge lamp could radiate light beams at 100 lumen ±15% /watt. Thus, a discharge lamp provides a beam twice as strong as that of a halogen lamp. A discharge lamp has the further advantage that power consumption is low, typically 35 watts. A discharge lamp has life time four times as long as that of a halogen lamp. Therefore, a discharge lamp saves energy, and is ideal for a head light of a vehicle.

The current applicant has proposed a Japanese patent laid open publication 57504/1995, in which a compatible base plate acceptor for both a conventional projector type halogen lamp and a discharge lamp is proposed. That base plate acceptor can be used with high operational voltage.

A head light for a vehicle must be capable of switching a beam between a high beam mode and a low beam mode.

However, it is impossible to mount two light sources in a single discharge lamp, as is the case of a conventional halogen lamp. Further, it is impossible to mount two discharge lamps in front of a reflector because of the small mounting area, structure of a reflector, and cost.

Further, a light source of a discharge lamp is smaller than that of a conventional halogen lamp. Therefore, when a discharge lamp substitutes a halogen lamp, a structure to remove glare is essential.

Although the Japanese patent laid open publication 57504/1995 proposed a compatible base plate acceptor used for a high voltage discharge lamps and a conventional projector type halogen lamp, it has no switching facility into high beam or low beam, and no glare stop.

SUMMARY OF THE INVENTION

An object of the present invention is to provide a new and improved head light system by solving the disadvantages and limitations of prior head light systems.

It is also an object of the present invention to provide a head light system for a discharge lamp, having a high beam mode, a low beam mode, and a glare stop structure.

The above and other objects are attained by a head light system having a discharge lamp as a light source comprising; a base plate for fixing said discharge lamp, a shade in half-cylindrical shape arranged close to said discharge lamp for partially shading light of said discharge lamp, and moving means for relatively moving one of said discharge lamp and said shade relative to the other.

Preferably, said moving means comprises a remotely controllable means.

Preferably, said discharge lamp is mounted on a base plate of the discharge lamp, said shade is fixed close to said discharge lamp, and means for rotating said base plate is provided.

Preferably, said moving means slides said shade along a longitudinal axis of said discharge lamp so that said shade shades upper half or lower half of said discharge lamp.

Preferably, said moving means slides said discharge lamp, and said shade which shades said discharge lamp partially is fixed to a base plate.

Preferably, said moving means comprises a solenoid and a spring.

Preferably, said moving means comprises a male screw driven by a stepping motor, and a female screw engaged with said male screw for linear movement of one of said discharge lamp and said shade.

Preferably, said base plate for said discharge lamp is compatible with a base plate of a conventional base plate for a halogen lamp.

Preferably, said shade has a glare top arrangement having alternate projection and recess at extreme end of said shade in longitudinal direction.

BRIEF DESCRIPTION OF THE DRAWINGS

The foregoing and other objects, features, and attendant advantages of the present invention will be appreciated as the same become better understood by means of the following description and drawings wherein.

DESCRIPTION OF THE PREFERRED EMBODIMENTS

The embodiments of the present head light system are now described in accordance with the drawings. The present head light system is directed to a head light system for a vehicle, and uses a discharge lamp, a reflector and a lens. The essential features of the present invention are a beam switching means, and glare stop means in a head light system using a discharge lamp.

Figure 1A:
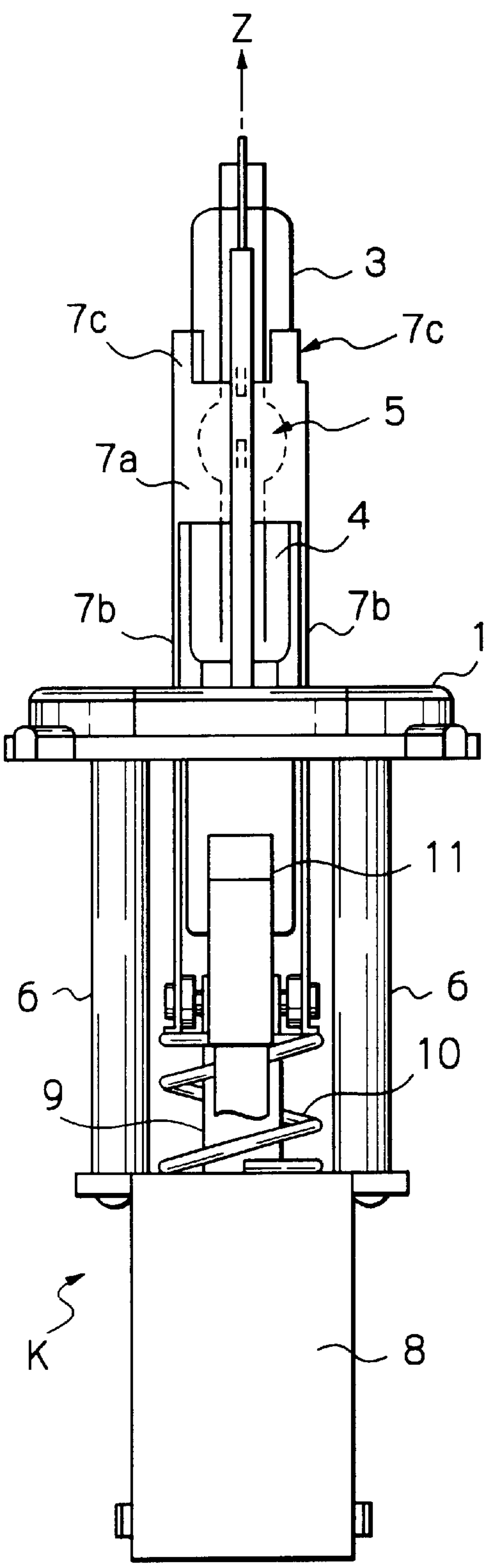
FIGS. 1(*a*) and 1(*b*) is an illustration of the first embodiment of the present head light system, in which FIG. 1(*a*) shows a low beam mode, and FIG. 1 (*b*) shows a high beam mode, FIGS. 2(*a*) and 2(*b*) is an illustration of a cross section of the present head light system in which FIG. 2(*a*) shows a base plate and a moving means, and FIG. 2(*b*) is a side view of the head light system of FIG. 2(*a*).
Figure 1B:
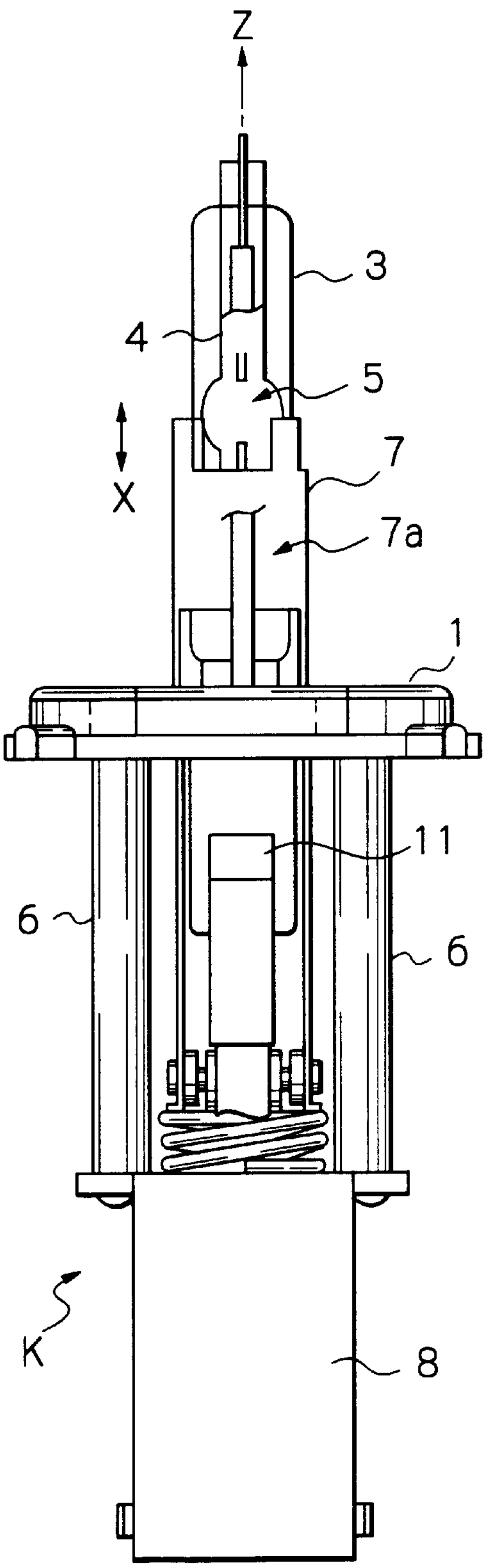

FIG. 1(*a*) is a front view of a head light system in low beam mode according to the present invention, and FIG. 1(*b*) is a front view of the same in high beam mode.

Figure 2A:
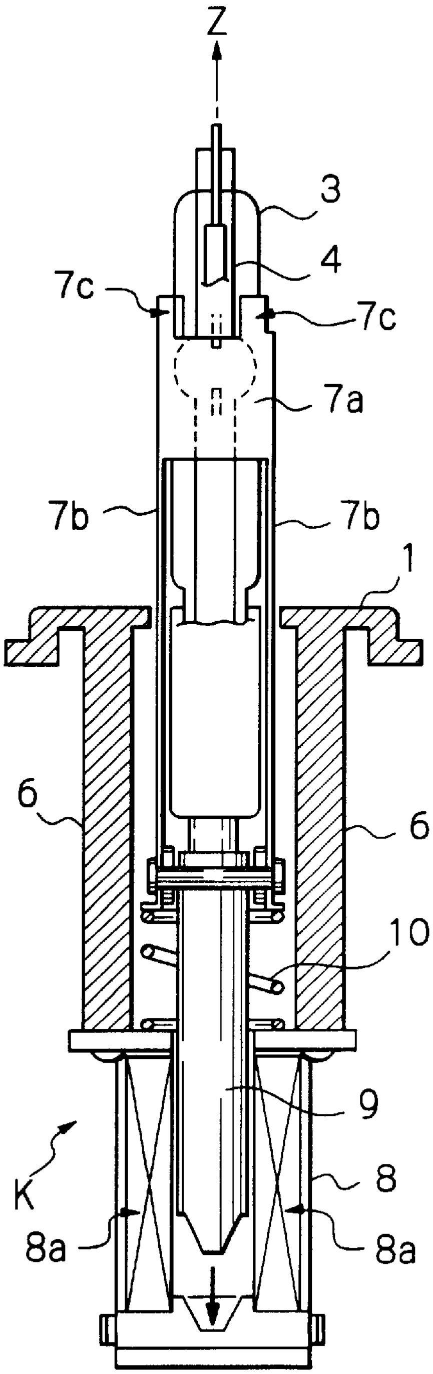
Figure 2B:
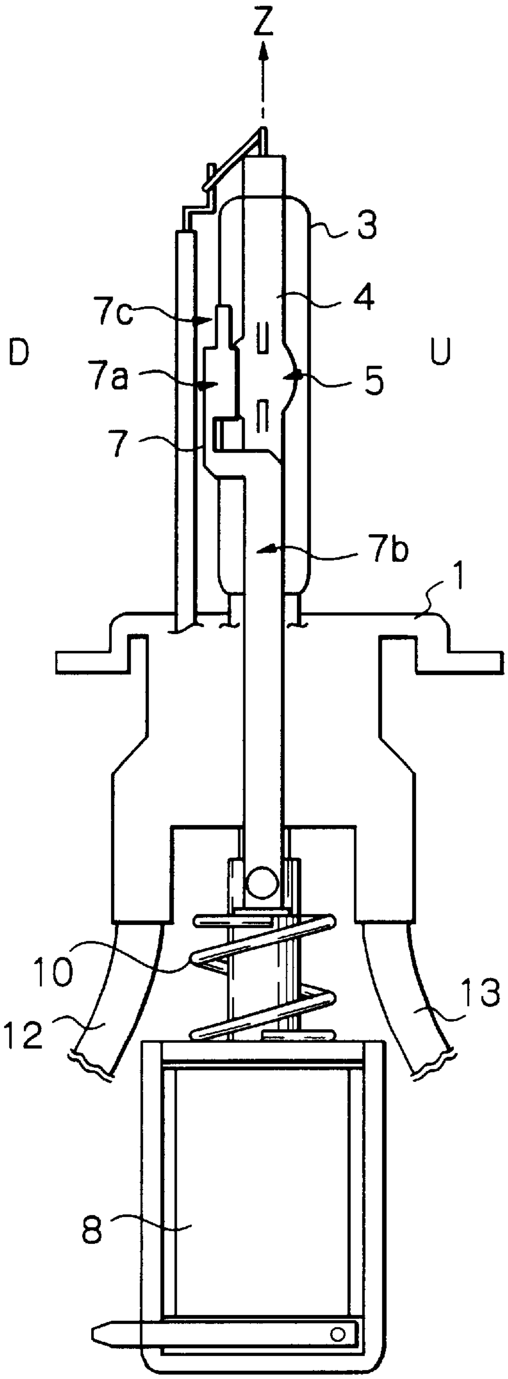

FIG. 2(*a*) is a partial sectional view for explanation of the relative slide means of a discharge lamp and a base plate, and FIG. 2(*b*) is a side view of the same.

Figure 3A:
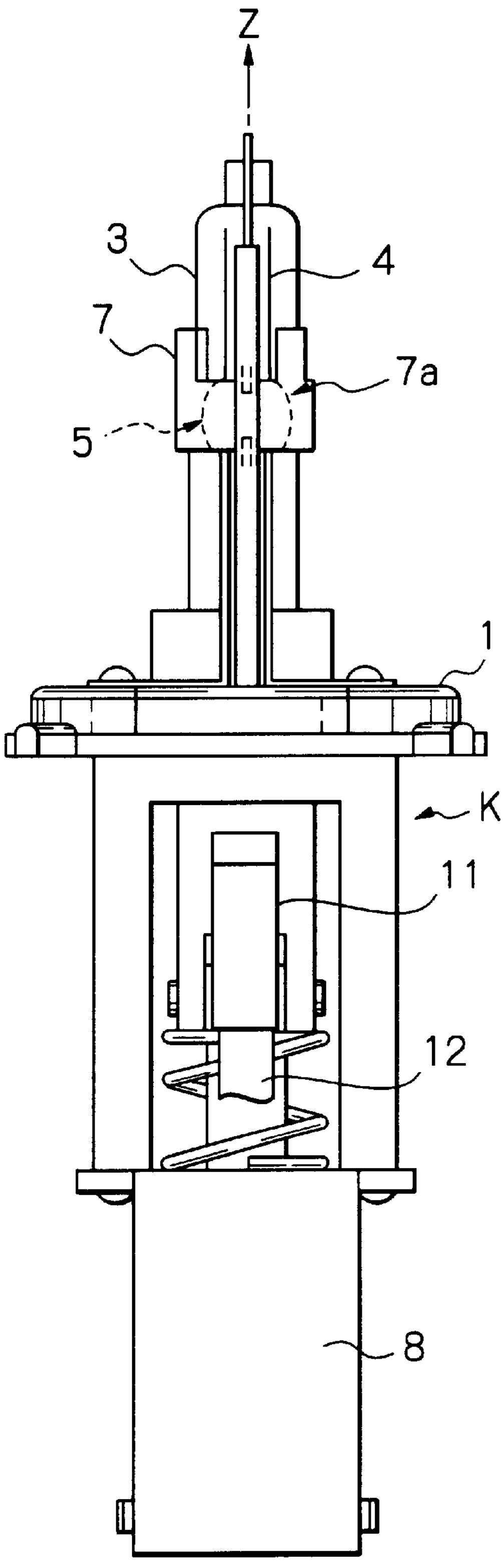
FIGS. 3(*a*) and 3(*b*) is an illustration of another embodiment of the present head light system, in which FIG. 3(*a*) shows a low beam mode and FIG. 3(*b*) shows a high beam mode, FIGS. 4(*a*) and 4(*b*) is an illustration of still another embodiment of the present head light system, in which FIG. 4(*a*) shows a low beam mode and FIG. 4(*b*) shows a high beam mode, FIGS. 5(*a*) and 5(*b*) is an illustration of still another embodiment of the present head light system, in which FIG. 5(*a*) shows a low beam mode and FIG. 5(*b*) shows a high beam mode, and FIGS. 6(*a*) and 6(*b*) is an illustration of still another embodiment of the present head light system, in which FIG. 6(*a*) shows a low beam mode, and FIG. 6(*b*) shows a high beam mode.
Figure 3B:
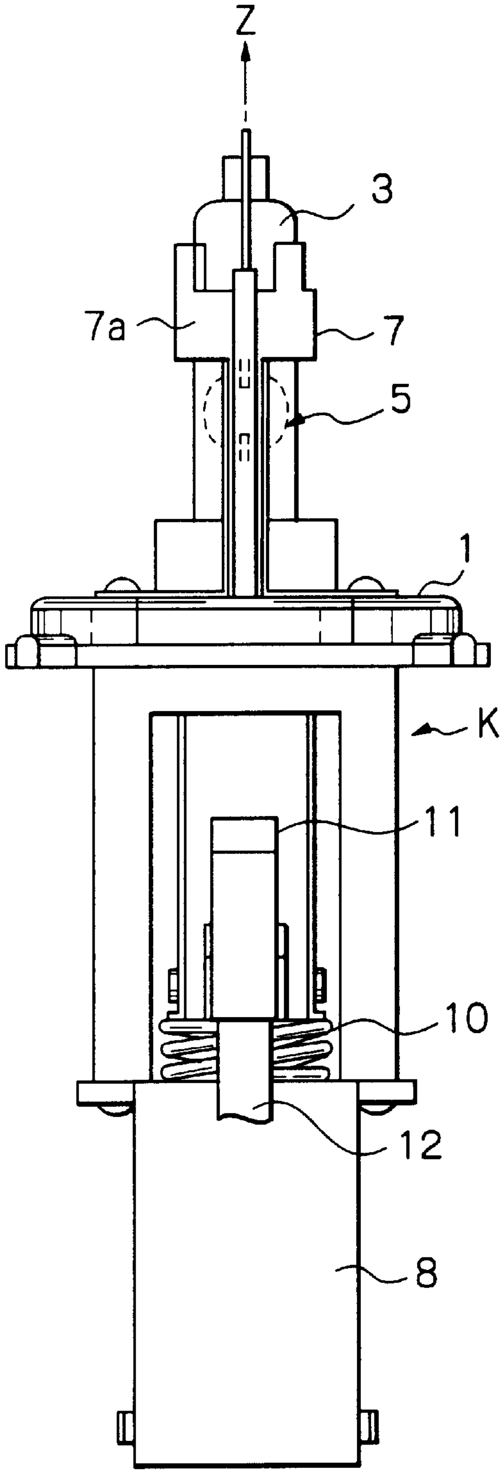

FIG. 3(*a*) is a front view of another embodiment of the present head light system in low beam mode, and FIG. 3(*b*) is a front view of the same in high beam mode.

Figure 4A:
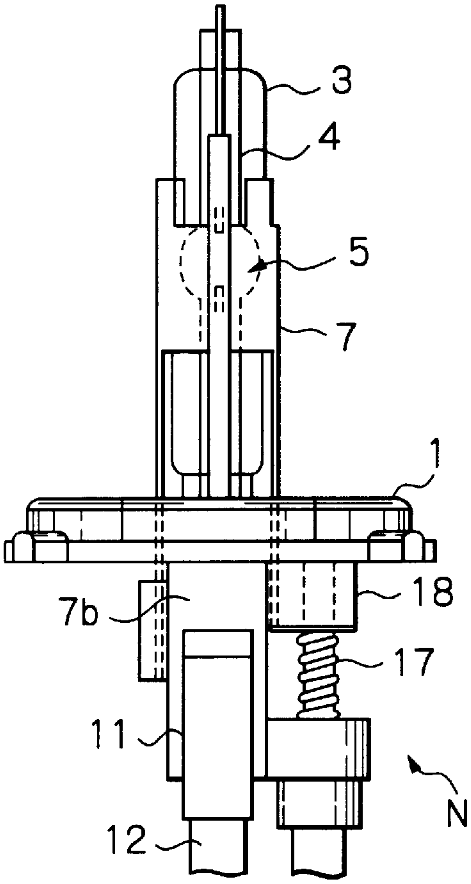
Figure 4B:
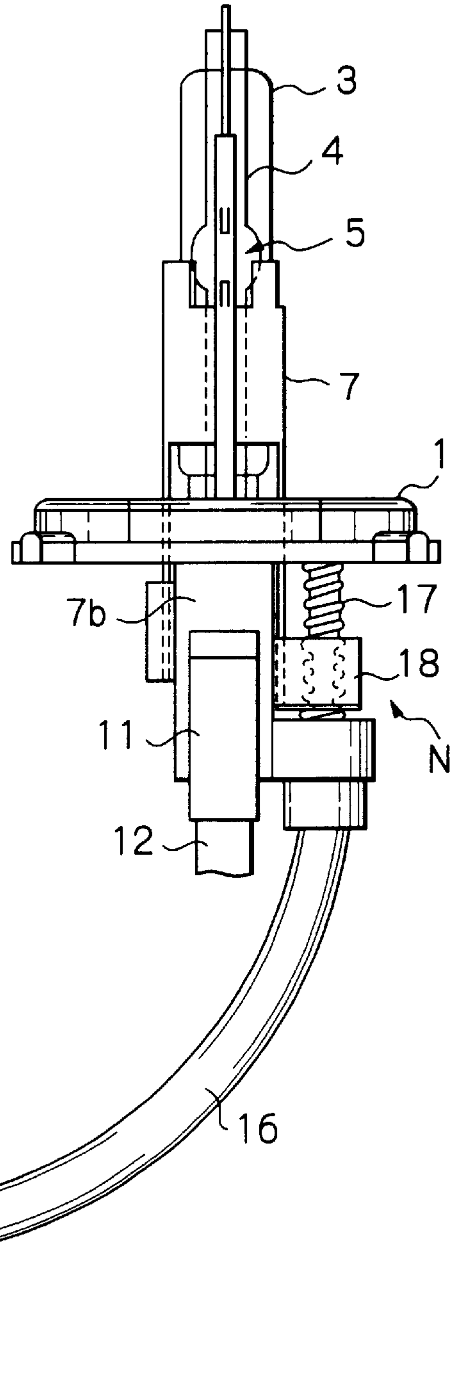
Figure 4B:
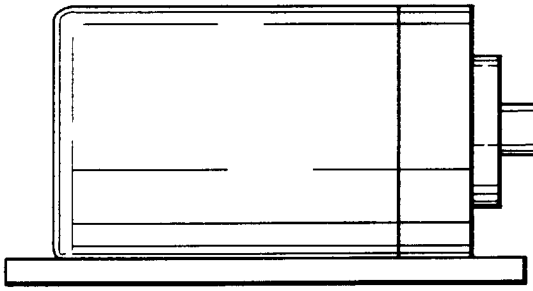

FIG. 4(*a*) is a front view of still another embodiment of the present head light system in low beam mode, and FIG. 4(*b*) is a front view of the same in high beam mode.

Figure 5A:
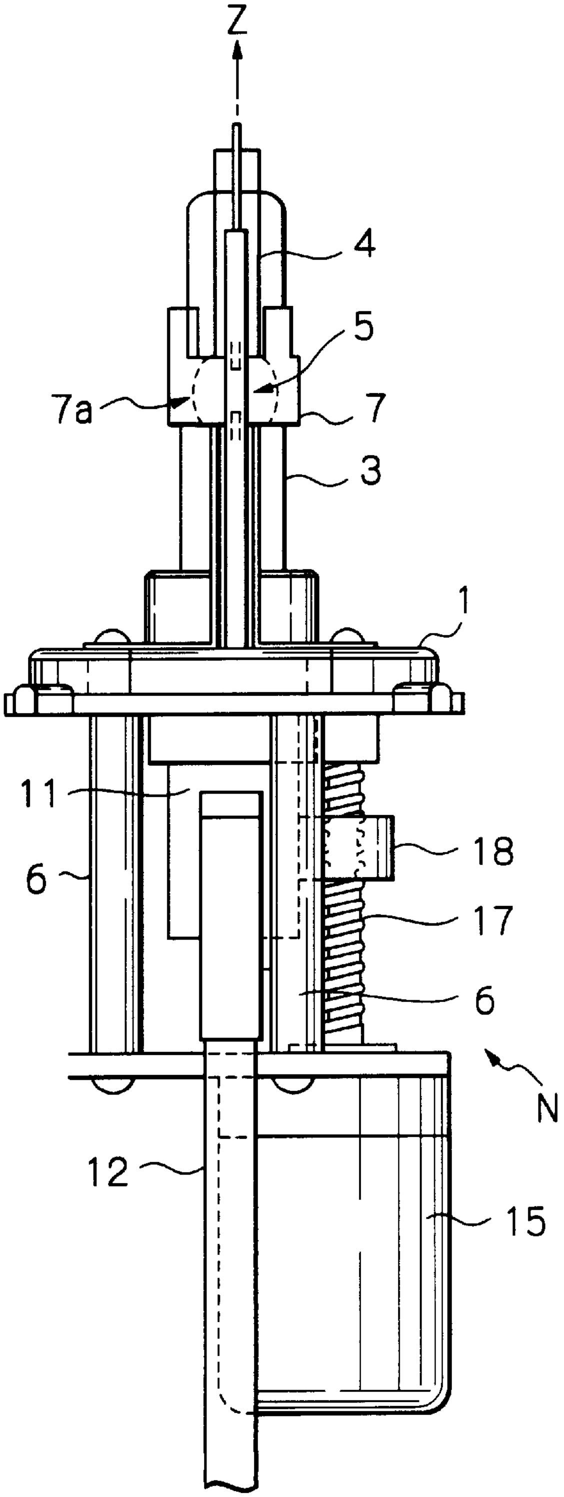
Figure 5B:
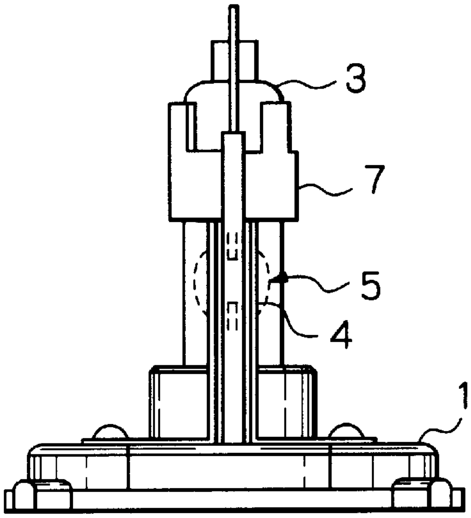

FIG. 5(*a*) is a front view of still another embodiment of the present head light system in low beam mode, and FIG. 5(*b*) is a front view of the same in high beam mode.

Figures 6A, 6B:
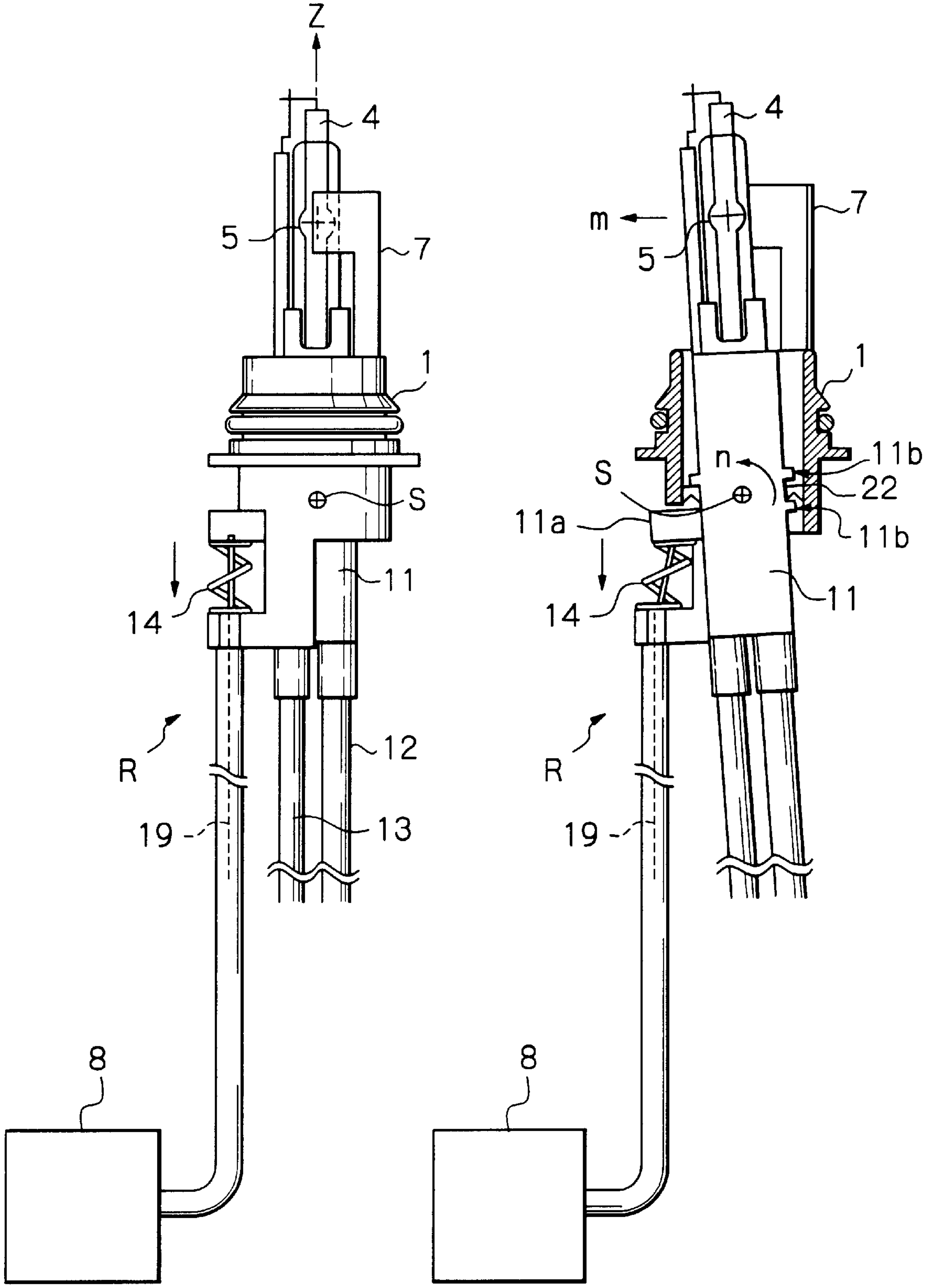

FIG. 6(*a*) is a front view of still another embodiment of the present head light system in low beam mode, and FIG. 6(*b*) is a front view of the same in high beam mode.

It is supposed that the present head light system comprises a dome type reflector (not shown), and a discharge lamp (a xenon lamp or HID) positioned on the center axis of the reflector so that light generate by the discharge lamp and reflected by the reflector illuminates along a front line of a vehicle.

In FIGS. 1 and 2, a base plate 1 carries a discharge lamp 4. A shade 7 positioned close to the discharge lamp, can slide in a vertical direction, as indicated by the arrow X, along a Z-axis of the discharge lamp 4 so that upper half U or lower half D of the lamp is shaded by the shade 7. The slide movement of the shade is energized by a slide means K.

The base plate 1 may be either specific to a discharge lamp, or compatible with that of a halogen lamp which is now widely used in conventional vehicles (for instance, H-4 type). The latter is preferable, as it can be mounted in a conventional vehicle, and save cost. A socket 11 is used for accepting a discharge lamp base 1.

A shade 7 is made of material which prevents a light beam from passing though the shade, for instance, a thin metal plate, a heat resisting plastic plate, or ceramics. The shade 7 has a leg 7*b* which penetrates a base plate 1 and is coupled with a movable iron piece 9 in a solenoid 8. The solenoid 8, the iron piece 9 and a spring 10 constitutes a slide means K of the shade 7. The slide means K is fixed to a rod 6 which extends under the base plate 1. The iron piece 9 is urged upward by the spring 9.

Thus, when the solenoid 8 is not energized, the shade 7 positions a shade plan 7*a* which is in a half cylindrical shape, at the approximate same height of a light generation point or a light source 5 of a discharge lamp 4 so that the light beam is partially shaded, and the head light system operates with a low beam mode. The shade 7 further functions in low beam mode as a glare stop.

When it is in high beam mode, the coil 8*a* of the solenoid 8 is energized so that the iron piece 9 is attracted beneath and against the spring 10, so that the shade 7 slides downwards towards the solenoid 8. The length of the movement of the shade 7 is preferably in the range of 3–10 mm. Then, the shade plane 7*a* of the shade 7 slides downwards from the light source point 5 of the discharge lamp (the position of FIG. 1(*a*)), so that the light source point 5 is not shaded. Thus, the light generated by the discharge lamp 4 is radiated in the whole direction, reflected by a reflector (not shown), and is forwarded ahead as a high beam. FIG. 1(*b*) shows the operation in high beam mode.

The current inventor realized that the glare stop operation is not enough when a simple shade plane 7*a* is used in low beam mode. In order to solve this problem and provide the improved glare stop structure, the current inventor proposes that the shade plane 7*a* of the shade 7 covers almost half of the discharge lamp 4 in the longitudinal direction (along Z-axis), and has some projections or teeth 7*c* in the longitudinal direction of the discharge lamp 4. Thus, the end of the shade 7 has alternate teeth and recesses, as shown in FIG. 2(*a*). The precise dimensions and structure of the shade 7 are designed according to a lens, a reflector and a base plate 1 of a head light system.

As described above, the first embodiment in FIGS. 1(*a*), 1(*b*), 2(*a*) and 2(*b*) has a slidable shade 7 which is positioned close to a discharge lamp 4 so that the light beam of the discharge lamp 4 is selectively and partially prevented by the shade 7 to switch between low beam mode and high beam mode. The embodiment shows the case that a discharge lamp 4 is fixed and a shade 7 slides.

It should be understood of course that the movement of a discharge lamp and a shade may be relative, and therefore, the modification that a shade is fixed to a base plate 1, and a discharge lamp slides with respect to a shade and a base plate is of course possible.

FIG. 3 shows the second embodiment, in which a discharge lamp 4 slides along a vertical Z-axis relative to a lamp base plate 1 by a moving means K, and a shade 7 is fixed in relation to the base plate 1.

In the above structure, a discharge lamp 4, together with a valve 3, socket 11, an insulated wire 12 coupled with an electrode of the discharge lamp 4, and a slidable iron piece 9, is attracted into a solenoid 8. Thus, when the solenoid 8 is not energized, the discharge lamp 4 is positioned, as shown in FIG. 3(*a*), and provides a low beam. When the solenoid 8 is not energized, the discharge lamp 4 slides downwards as shown in FIG. 3(*b*), and provides a high beam. The shade plane in FIG. 3 has teeth for glare stop by use of the alternate arrangement of a projection and a recess, as is the case of the previous embodiment.

The above embodiments show that a discharge lamp 4 or a shade 7 slides vertically along a Z-axis. It should be noted that the operation mode, high beam mode or low beam mode, depends upon not only on a discharge lamp and a shade, but also a reflector and a lens. Therefore, the relative movement of a discharge lamp 4 and a shade 7 is not restricted to vertical direction along Z-axis, but the movement in horizontal direction, or in slant direction is possible, as far as the relative positioning of a discharge lamp and a shade is defined by a moving means K according to the structure of a head light system. Therefore, the essential feature of the present invention is the relative movement of a discharge lamp and a shade, but the present invention is not restricted by an actual structure of a discharge lamp, a shade, and/or a moving means shown in the figures. Further, a shade 7 is not restricted to be fixed to a base plate, but it may be fixed to a body of a head light system. For instance, it may be fixed to a reflector.

Now, a modification of a slide or moving means K for sliding a discharge lamp 4 or a shade 7 is described in accordance with FIG. 4.

In FIG. 4, a sliding means N comprises a stepping motor 15, which is coupled with a screwed rod 17 through a wire 16. A female screw 18 is engaged with the screwed rod 17 so that the female screw 18 moves linearly in accordance with the rotation of the screwed rod 17. The female screw 18 fixed to leg 7*b* of the shade 7 moves linearly in accordance with the rotation of the screwed rod 17 which is rotated by the stepping motor 15. In FIG. 4(*a*), a shade plane 7*a* shades a part of the light source 5 for a low beam mode. When a shade plane 7*a* moves linearly and releases the light source 5 as shown in FIG. 4(*b*), the head light system operates in a high beam mode.

Another modification of a moving means is possible, so that a discharge lamp 4 slides or moves linearly with respect to a shade 7 which is fixed to a base plate 1 by means of a rack and a pinion.

In FIGS. 5(*a*) and 5(*b*), a stepping motor 15 is fixed to a rod 6 which extends under a base plate 1. The stepping motor 15 rotates a screwed rod 17 which moves a female screw 17 linearly. In FIG. 5(*a*), a light source of a discharge lamp 4 is covered by a shade plane 7*a* of shade 7 so that a low beam mode is provided. On the other hand, the assembly of a discharge lamp 4, a valve 3, a socket 11 which supports the discharge lamp 4, and a female screw 18 is moved linearly along the Z-axis as shown in FIG. 5(*b*), so that the light source 5 is released from the shade 7, and the beam is switched to a high beam mode.

Still another modification of a moving means is described in accordance with FIGS. 6(*a*) and 6(*b*). FIGS. 6(*a*) and 6(*b*) show that a socket 11 which carries a discharge lamp 4 having a HB-1 type base plate 1 is pivotablly coupled with an axis S which is perpendicular to a longitudinal axis Z of the discharge lamp 4. A shade 7 which partially covers the discharge lamp 4 is fixed to the base plate 1. A moving means R makes said socket 11 rotate around the axis S. Said socket 11 has some space in the base plate 1 so that the socket 11 itself can rotate around the axis S by 5–20 degrees. The moving means R comprises a wire 19 which is connected to a solenoid 8 so that a projection 11*a* of the socket 11 is pulled against a spring 14 which is fixed to the base plate 1. When the solenoid 8 is not energized, the discharge lamp 4 is positioned perpendicular to a plane of the base plate 1 so that the shade 7 partially covers the discharge lamp so that a low beam is provided. When the solenoid 8 is energized, the wire 19 is pulled and then the socket 11 rotates around the axis S in the angular direction shown by the arrow n. Then, the discharge lamp 4 rotates in an angular direction shown by an arrow m so that the discharge lamp goes away from the shade 7. Thus, a high beam is provided. In FIG. 6(*b*), a projection 11*b* and an O-ring 22 mounted between projections 11*b*—11*b* functions for water proofing and dust proofing by closing a gap between the socket 11 and the base plate 1.

It should be noted in FIGS. 4(*a*), 4(*b*), 6(*a*) and 6(*b*) that a moving means N or R has a wire 16 or 19 for moving a shade 7 relatively to a discharge lamp 4. Thus, a moving means in those embodiments is remotely controlled. A remotely controlled moving means is advantageous in a vehicle which has less space for mounting a head light system. Thus, the present head light system can be used widely even in a vehicle which has less space for mounting. A remotely controllable moving means is not restricted to a wire as shown in the embodiments of FIGS. 4(*a*), 4(*b*), 6(*a*) and 6(*b*), but a remotely controllable moving means which uses oil pressure, air pressure, and/or radio wave is possible.

A moving means in the present invention is not restricted to an embodiment K and R which have a solenoid and a spring, and a stepping motor and a screw, respectively, but other modifications are possible. For instance, a means can be implemented having an electromagnet which attracts a magnetic shade or a socket which has a magnetic material for slide movement or rotational movement.

Although the above description is described for an example that is applied to a H-4 or a HB-1 type halogen lamp, a type of a base plate of the present invention is not restricted to the embodiments, but the present invention is applicable to other types of base plates. Further, the present invention is not restricted to the use of a vehicle, but the use of a boat is possible.

The specific effects of the present invention having switching structure between low beam mode and high beam mode in a head light system using a discharge lamp are enumerated as follows.

1) Switching between low beam mode and high beam mode is possible in a head light system using a single discharge lamp.

2) It can fit with a conventional base plate for a conventional halogen lamp, and therefore, the replacement of a conventional halogen lamp to a discharge lamp is simply possible.

3) A glare stop structure which is essential for a discharge lamp having a small light source is realized by using a shade.

4) A remotely controlled moving means is possible, and therefore, it can be mounted in a small space in a vehicle, which has in general less space for additional devices.

From the foregoing, it is apparent that a new and improved head light system has been found. It should be understood of course that the embodiments disclosed are merely illustrative and are not intended to limit the scope of the invention. Reference should be made, therefore, to the appended claims to indicate the scope of the invention.

What is claimed is:

1. A head light system having a discharge lamp as a light source comprising:

a base plate for carrying said discharge lamp, a shade in a half cylindrical shape arranged close to said discharge lamp for partially shading light of said discharge lamp, moving means for relatively moving one of said discharge lamp and said shade relative to the other, wherein said moving means slides said shade along a longitudinal axis of said discharge lamp so that said shade shades an upper half or a lower half of said discharge lamp, and said base plate for said discharge lamp being compatible with a base plate of a conventional base plate for a halogen lamp.

2. A head light system according to claim 1, wherein said moving means comprises remotely controllable means.

3. A head light system according to claim 1, wherein said discharge lamp is mounted on a base plate of the discharge lamp, said shade is fixed close to said discharge lamp, and means for rotating said base plate is provided.

4. A head light system according to claim 1, wherein said moving means slides said discharge lamp, and said shade which shades said discharge lamp partially is fixed to a base plate.

5. A head light system as in one of claims 1–3 and 4, wherein said moving means comprises a solenoid and a spring.

6. A head light system according to one of claims 1–3 and 4, wherein said moving means comprises a male screw driven by a stepping motor, and a female screw engaged with said male screw for linear movement of one of said discharge lamp and said shade.

7. A head light system according to claim 1, wherein said shade has a glare stop having teeth by alternate arrangement of a projection and a recess at an extreme end of said shade in a longitudinal direction of the same.

* * * * *